P. W. GRAY.
OPTICAL SIGHTING DEVICE FOR AIRCRAFT AND THE LIKE.
APPLICATION FILED JUNE 12, 1918.
1,402,064.                    Patented Jan. 3, 1922.
2 SHEETS—SHEET 1.
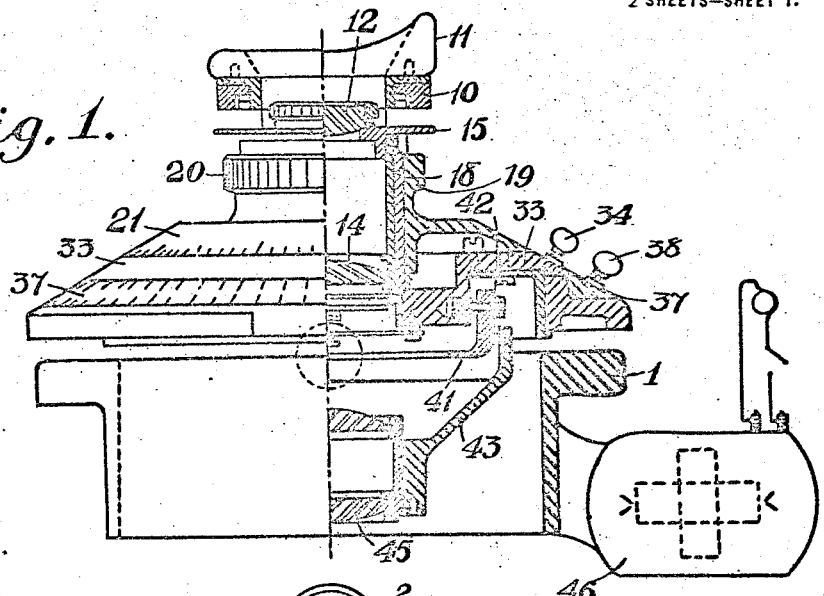
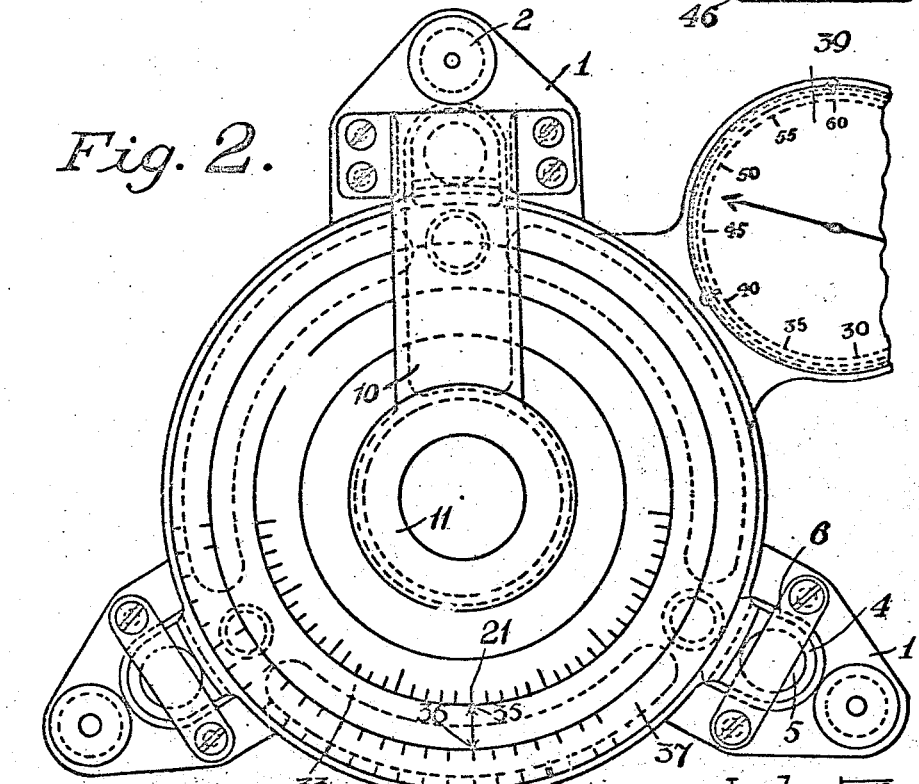

P. W. GRAY.
OPTICAL SIGHTING DEVICE FOR AIRCRAFT AND THE LIKE.
APPLICATION FILED JUNE 12, 1918.

1,402,064.
Patented Jan. 3, 1922.
2 SHEETS—SHEET 2.

UNITED STATES PATENT OFFICE.

PERCY WILLIS GRAY, OF YORK, ENGLAND, ASSIGNOR OF ONE-HALF TO ALFRED TAYLOR, OF YORK, ENGLAND.

OPTICAL SIGHTING DEVICE FOR AIRCRAFT AND THE LIKE.

1,402,064.  Specification of Letters Patent.  Patented Jan. 3, 1922.

Application filed June 12, 1918. Serial No. 239,629.

(GRANTED UNDER THE PROVISIONS OF THE ACT OF MARCH 3, 1921, 41 STAT. L., 1313.)

*To all whom it may concern:*

Be it known that I, PERCY WILLIS GRAY, a subject of the King of Great Britain, residing at York, in the county of York and Kingdom of England, have invented certain new and useful Improvements in Optical Sighting Devices for Aircraft and the like, (for which I have filed an application in England, June 11, 1917, Patent No. 127,877,) of which the following is a specification.

The present invention relates to improvements in sighting devices for use on aircraft and the like.

According to the present invention a sighting device consisting of an eye-piece and an object glass, usually forming part of another instrument such as a bomb dropping mechanism taken by way of example, is divided into two parts, one of which, the eye-piece, being carried in fixed relationship to the base, that is to say that it may move if desired about its axis in a predetermined plane or again may have a movement at right angles to that plane such as for focussing purposes or in the case of a variable power eye-piece, but generally speaking is limited in its movement whilst, however, the object glass is unrestrained in its movement relatively to the base or general main portion of the instrument.

This object glass portion is preferably mounted on gimbals or on a ball and socket joint usually about a centre which will be the centre of the focal plane of the said object glass.

A diaphragm or scale can be mounted conveniently in this focal plane to be carried by the eye-piece portion of the instrument and to be movable across its field of view by a cam or other suitable means.

The object glass can be restrained by external means to take up a constant position relatively to the surface of the earth, such as for instance by arranging it to have considerable inertia, or by connecting it to external means isolated from any dynamic condition of the body carrying it, that is to say by any of the multitudinous forms of gyrostats.

The invention is more particularly described with reference to the accompanying drawings in which:—

Figure 1 is a partial sectional elevation of the device applied to a sight adapted for the navigation of aircraft.

Figure 2 is a corresponding top plan view,

Figure 3:
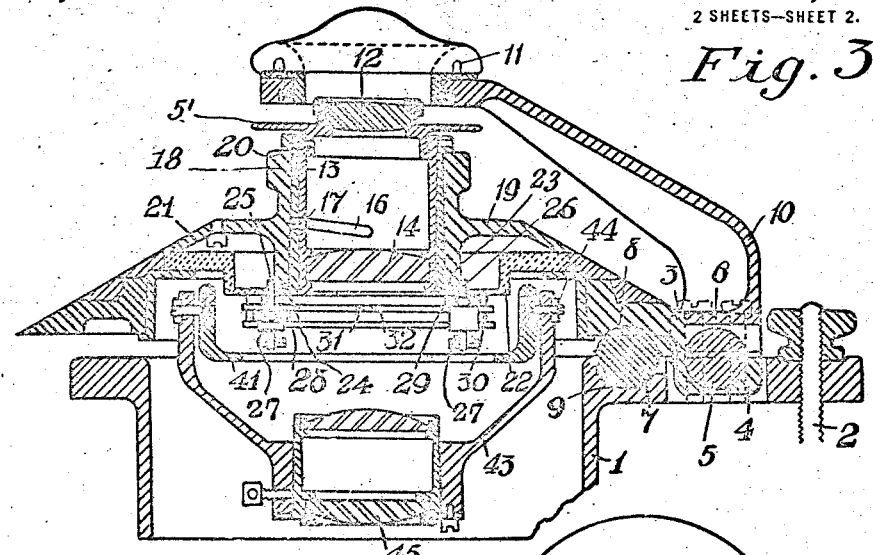
Figure 3 is a sectional side view of the device.
Figure 4:
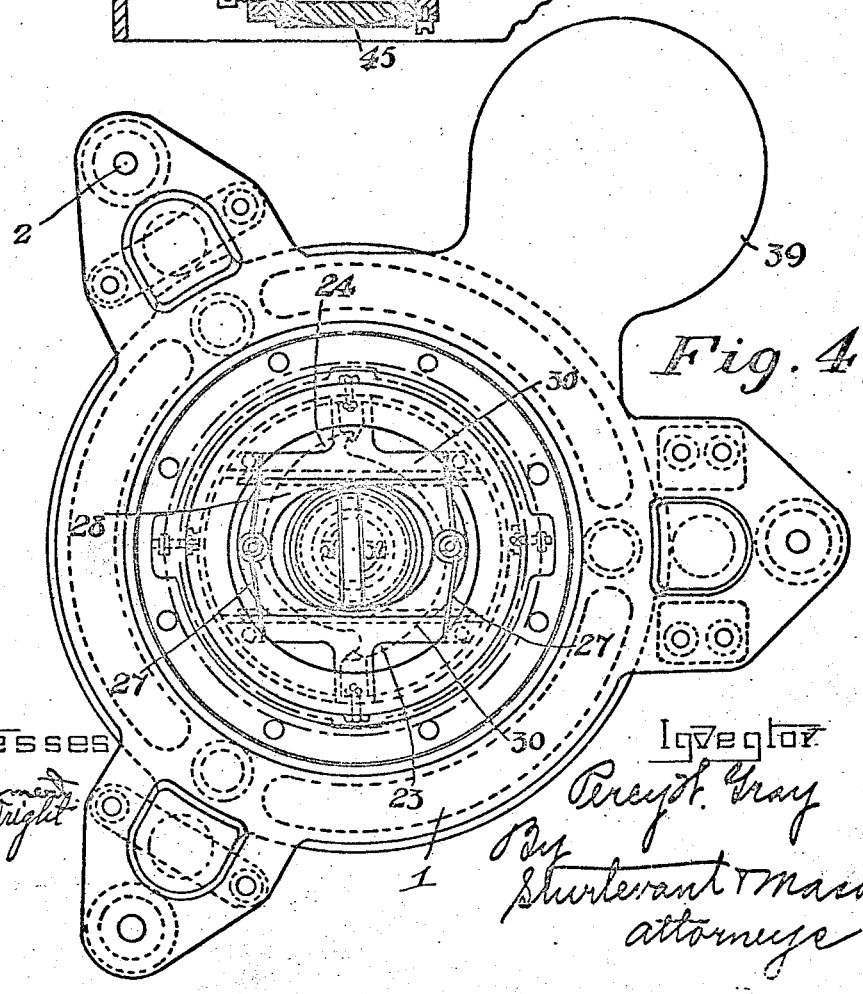
Figure 4 is a bottom plan view.

The device comprises a rigid tubular support 1 which can be clamped by screws 2 to a supporting bracket or the like. The instrument proper is mounted on the support 1 to be insulated against vibration or shocks thereon. A frame 3 has three feet 4 having recesses for the reception of rubber cushions 5 bearing under bridge pieces 6 mounted on the support 1. Rubber cushions 7 bear under the frame 3 in recesses 8 in it and over recesses 9 in the support 1. An upstanding bracket 10 on the frame 3 carries an eyeguard 11 within the field of which but mechanically separate therefrom lies an optical eyepiece comprising an eyelens 12 carried in a tube 13 also supporting the field lens 14, the lenses 12 and 14 forming an eyepiece but it is to be understood that any other lens combination or arrangement may be used as an eyepiece. A milled edge flange 15 is carried on the tube 13 accessible to the operator so that by turning this the eyepiece can be focussed according to the desire of the operator the tube 13 being cam slotted at 16 to engage a pin 17 fixed to a sleeve 18 mounted on the frame 3. About this sleeve can turn a second sleeve 19 having a milled operating head 20 and a graduated dial 21. The sleeve 18 has cam surfaces 23, 24 upon it adapted to engage pins 25, 26 respectively which slide in radial slots in a disc 22. Springs 27 tend to keep the pins in contact with the said cam surfaces. The pin 25 passes through a V-shaped frame 28 the legs 30 of which overlap the legs of the frame 29. The frame 29 carries a cross wire 32, while the frame 28 carries a similar cross wire 31. It will consequently be seen that if the head 20 be rotated it will rotate the sleeve 18 which causes the relative movement of the two frames 28 and 29 carrying the wires 32 and 31, and this will cause an even displacement of the two cross wires relatively to the centre line of the field of view. The graduated scale 21 cooperates with an index 35 on an annulus 33 movable by head 34, which scale has another index 36 cooperating with a scale of degrees of arc on an annulus 37 movable by head 38. The frame 3 is provided on one side, at its outer periphery, with a lug 40' having an index 40 adapted to indicate the proper reading on the dial 21.

The frame 3 may carry a suitable support 39 for a stop watch.

In use the scale 37 is by means of the head 38 brought into a position so that a desired angle of bearing in azimuth can be read opposite the index 40. Then the annulus 33 is by means of the head 34 brought into a position in which the earth is seen to be moving at right angles to the cross wires 31 and 32. The angle of flight due to drift is readable on the index 36. Finally the head 18 is rotated to separate the cross wires corresponding to a given height on the altimeter of the machine and set up on the scale 21 opposite the index 35. The cross wires will then be set apart at such a given distance that by observing by means of the stop watch the time taken by an object on the earth to pass from under one cross wire 31 to under the other 32 the ground speed can be immediately calculated. Carried by the frame 3 is a disk 22 serving as a support for the frame through the medium of trunnions, hereinafter described.

On a frame 41 movable with and pivoted by means of trunnions 42 on the disc 22 is a subframe 43 similarly mounted on trunnions 44 on the frame 41 which subframe carries the object glasses 45 and other lenses (when necessary) to form an optical telescope combination with the eyepiece 12, 14. The trunnions 44, 42 lie in the focal plane and consequently any motion of the objective which is maintained vertical by reason of its mass or by means of a gyrostat 46 suitably connected to the subframe 43, will not interfere with the proper functioning of the telescope in spite of the fact that the eyelens is fixed as of course the said objective is turning about the centre of the focal plane as a pivot.

I declare that what I claim is:—

1. An aircraft navigational sight comprising an optical element fixed to the aircraft, and a moving optical element cooperating therewith and pivoted about a point lying in the focal plane.

2. An aircraft navigational sight comprising an eyepiece fixed on the aircraft, and an objective pivoted about a line lying in the focal plane.

3. An aircraft navigational sight comprising an eyelens fixed on the aircraft, a field lens cooperating therewith and fixed with it, and an objective pivoted about a point lying in the focal plane.

4. An aircraft navigational sight comprising an eyelens, fixed on the aircraft, a field lens cooperating therewith and fixed with it, and a plurality of optical elements forming an objective system pivoted together about a point in the focal plane.

5. An aircraft navigational sight comprising an optical element mounted on the aircraft, and a moving optical element cooperating therewith and pivoted about a point lying in the focal plane and means to turn the elements about the optical axis.

6. An aircraft navigational sight comprising an eyelens mounted on the aircraft, a field lens cooperating therewith and fixed with it, and an objective pivoted about a point lying in the focal plane, and means to turn the lenses about the optical axis.

7. An aircraft navigational sight comprising an eyelens, mounted on the aircraft, a field lens cooperating therewith and fixed with it and a plurality of optical elements forming an objective system pivoted together about a point in the focal plane, and means to turn the whole telescope system about the optical axis.

8. An aircraft navigational sight comprising an optical element fixed to the aircraft, and a moving optical element cooperating therewith and pivoted about a point lying in the focal plane, and a graticule in said focal plane.

9. An aircraft navigational sight comprising an optical element mounted to the aircraft, and a moving optical element cooperating therewith and pivoted about a point lying in the focal plane, and means to turn the elements about an optical axis, and a graticule in said focal plane.

10. An aircraft navigational sight comprising an optical element fixed to the aircraft, and a moving optical element cooperating therewith pivoted about a point lying in the focal plane, a pair of cross wires in said focal plane, and means to move said cross wires relatively to one another.

11. An aircraft navigational sight comprising an eyelens mounted on the aircraft, a field lens cooperating therewith and fixed with it, and an objective pivoted about a point lying in the focal plane, and means to turn the lenses about the optical axis, a pair of cross wires in said focal plane, and means to move said cross wires relatively to one another.

12. An aircraft navigational sight comprising an eyelens fixed on the aircraft, a field lens cooperating therewith and fixed with it, and an objective pivoted about a point lying in the focal plane, a pair of cross wires in said focal plane and means to move said cross wires relatively to one another equally from the optical axis.

13. An aircraft navigational sight comprising an optical element fixed to the aircraft, and a moving optical element cooperating therewith and pivoted about a point lying in the focal plane, a pair of cross wires in said focal plane, and means to move said cross wires relatively to one another, and means to indicate the amount of said movement.

14. An aircraft navigational sight comprising an eyelens fixed on the aircraft, a field lens cooperating therewith and fixed with it, and an objective pivoted about a point lying in the focal plane, a pair of cross wires in said focal plane, and means to move said cross wires relatively to one another equally from the optical axis, and means to indicate the amount of said movement.

15. An aircraft navigational sight, comprising an optical element fixed to the aircraft, and a moving optical element cooperating therewith and pivoted about a point lying in the focal plane, and means to maintain said movable part in a constant position in space.

16. An aircraft navigational sight comprising an eyelens fixed on the aircraft, a field lens cooperating therewith and fixed with it, and an objective pivoted about a point lying in the focal plane, and means to maintain said objective in a constant position in space.

17. An aircraft navigational sight comprising an eyelens mounted on the aircraft, a field lens cooperating therewith and fixed with it, and an objective pivoted about a point lying in the focal plane, and means to turn the lenses about the optical axis and means to maintain said objective in a constant position in space.

18. An aircraft navigational sight comprising an optical element mounted on the aircraft, and a moving optical element cooperating therewith and pivoted about a point lying in the focal plane, a pair of cross wires in said focal plane, and means to move said cross wires relatively to one another, and means to maintain said movable part in a constant position in space.

19. An aircraft navigational sight comprising an eyelens mounted on the aircraft, a field lens cooperating therewith and fixed with it, and an objective pivoted about a point lying in the focal plane, a pair of cross wires in said focal plane, and means to move said cross wires relatively to one another equally from the optical axis, and means to maintain said movable part in a constant position in space.

20. An aircraft navigational sight comprising an optical element mounted to the aircraft, and a moving optical element cooperating therewith and pivoted about a point lying in the focal plane, and a gyrostat connected to the movable part to maintain it in constant position in space.

21. An aircraft navigational sight comprising an eyelens mounted on the aircraft, a field lens cooperating therewith and fixed with it, and an objective pivoted about a point lying in the focal plane, and means to turn the lenses about the optical axis in azimuth and a gyrostat connected to the movable part to maintain it in constant position in space.

22. An aircraft navigational sight comprising an eyelens mounted on the aircraft, a field lens cooperating therewith and fixed with it, and an objective pivoted about a point lying in the focal plane, a pair of cross wires in said focal plane, and means to move said cross wires relatively to one another equally from the optical axis, and a gyrostat connected to the movable part to maintain it in constant position in space.

23. An aircraft navigational sight comprising an optical element fixed to the aircraft, and a moving optical element cooperating therewith and pivoted about a point lying in the focal plane, a pair of cross wires in said focal plane, and means to move said cross wires relatively to one another, and means to indicate the amount of said movement, and a gyrostat connected to the movable part to maintain it in constant position in space.

24. An aircraft navigational sight comprising an optical element fixed to the aircraft, and a moving optical element cooperating therewith and pivoted about a point lying in the focal plane, a pair of cross wires in said focal plane, and means to move said cross wires relatively to one another, and means to indicate the amount of said movement, and means to indicate the angle of drift.

25. An aircraft navigational sight comprising an optical element fixed to the aircraft, and a moving optical element cooperating therewith and pivoted about a point lying in the focal plane, a pair of cross wires in said focal plane, and means to move said cross wires relatively to one another, and means to indicate the amount of said movement, and a gyrostat connected to the movable part to maintain it in constant position in space, and means to indicate the angle of drift.

26. An aircraft navigational sight comprising an eyelens fixed on the aircraft, a field lens cooperating therewith and fixed with it, and an objective pivoted about a point lying in the focal plane, a pair of cross wires in said focal plane and means to move said cross wires relatively to one another equally from the optical axis, a sliding scale to indicate the amount of said movement, and a second scale indicating angle of drift.

27. An aircraft navigational sight comprising an eyelens fixed on the aircraft, a field lens cooperating therewith and fixed with it, and an objective pivoted about a point lying in the focal plane, a pair of cross wires in said focal plane, and means to move said cross wires relatively to one another equally from the optical axis, and a gyrostat connected to the movable part to maintain it in constant position in space, a sliding scale to indicate the amount of said movement, and a second scale indicating angle of drift.

28. An aircraft navigational sight comprising an eyelens fixed on the aircraft, a field lens cooperating therewith and fixed with it and an objective pivoted about a point lying in the focal plane, a pair of cross wires in said focal plane and means to move said cross wires relatively to one another equally from the optical axis, a sliding scale to indicate the amount of said movement, and a second scale indicating angle of drift, and an azimuth scale.

29. An aircraft navigational sight comprising an eyelens fixed on the aircraft, a field lens cooperating therewith and fixed with it, and an objective pivoted about a point lying in the focal plane, a pair of cross wires in said focal plane, and means to move said cross wires relatively to one another equally from the optical axis, and a gyrostat connected to the movable part to maintain it in constant position in space, a sliding scale to indicate the amount of said movement, and a second scale indicating angle of drift, and an azimuth scale.

30. An aircraft navigational sight comprising an eyelens fixed on the aircraft, a field lens cooperating therewith and fixed with it and an objective pivoted about a point lying in the focal plane, a pair of cross wires in said focal plane and means to move said cross wires relatively to one another equally from the optical axis, a sliding scale to indicate the amount of said movement, and a second scale indicating angle of drift, and an azimuth scale, said three scales cooperating with one another and a fixed index.

31. An aircraft navigational sight comprising an eyelens fixed on the aircraft, a field lens cooperating therewith and fixed with it, and an objective pivoted about a point lying in the focal plane, a pair of cross wires in said focal plane and means to move said cross wires relatively to one another equally from the optical axis, and a gyrostat connected to the movable part to maintain it in constant position in space, a sliding scale to indicate the amount of said movement, and a second scale indicating angle of drift, and an azimuth scale, said three scales cooperating with one another and a fixed index.

32. An aircraft navigational sight comprising an eyelens fixed on the aircraft, a field lens cooperating therewith and fixed with it and an objective pivoted about a point lying in the focal plane, a pair of cross wires in said focal plane and means to move said cross wires relatively to one another equally from the optical axis, a sliding scale to indicate the amount of said movement, and a second scale indicating angle of drift, and an azimuth scale, said three scales cooperating with one another and a fixed index, and a clock indicating time.

33. An aircraft navigational sight comprising an optical element fixed to the aircraft, and a moving optical element cooperating therewith and pivoted about a point lying in the focal plane, and means to elastically insulate the fixed optical part from its support.

34. An aircraft navigational sight comprising an optical element fixed to the aircraft, and a moving optical element cooperating therewith and pivoted about two trunnions at right angles, lying in the focal plane.

35. An aircraft navigational sight comprising an eyelens fixed on the aircraft, a field lens cooperating therewith and fixed with it, and an objective pivoted about two trunnions at right angles lying in the focal plane.

36. An aircraft navigational sight comprising an eyelens fixed on the aircraft, a field lens cooperating therewith and fixed with it, and an objective pivoted about two trunnions at right angles lying in the focal plane, a pair of cross wires in said focal plane and means to move said cross wires relatively to one another equally from the optical axis.

37. An aircraft navigational sight comprising an eyelens fixed on the aircraft, a field lens cooperating therewith and fixed with it, and an objective pivoted about two trunnions at right angles lying in the focal plane, a pair of cross wires in said focal plane and means to move said cross wires relatively to one another equally from the optical axis, a sliding scale to indicate the amount of said movement, and a second scale indicating angle of drift.

In witness whereof, I have hereunto signed my name this 24th day of May, 1918, in the presence of two subscribing witnesses.

PERCY WILLIS GRAY.

Witnesses:
ANNIE JOHNSON,
ALFRED PROCTER.